(12) United States Patent
Sasaki et al.

(10) Patent No.: US 6,258,450 B1
(45) Date of Patent: Jul. 10, 2001

(54) DIELECTRIC CERAMIC COMPOSITION AND CERAMIC ELECTRONIC PARTS

(75) Inventors: Nobuhiro Sasaki; Yoshinao Takahashi; Katsuyuki Horie, all of Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/357,909

(22) Filed: Jul. 21, 1999

(30) Foreign Application Priority Data

Jul. 23, 1998 (JP) ................................................ H10-208286

(51) Int. Cl.⁷ ........................................................ B32B 3/00
(52) U.S. Cl. ........................ 428/210; 501/136; 501/137; 501/138
(58) Field of Search ................................... 501/136, 137, 501/138; 428/210

(56) References Cited

U.S. PATENT DOCUMENTS

| 4,477,401 | * | 10/1984 | Hagemann et al. | 264/345 |
|---|---|---|---|---|
| 4,606,906 | * | 8/1986 | Ritter et al. | 501/137 |
| 4,640,905 | * | 2/1987 | Burn | 501/137 |
| 5,612,268 | * | 3/1997 | Iwamoto et al. | 501/138 |
| 5,650,368 | * | 7/1997 | Tateishi et al. | 501/139 |
| 5,759,935 | * | 6/1998 | Mizutani et al. | 501/139 |
| 5,994,253 | * | 11/1999 | Sasaki et al. | 501/139 |
| 6,034,015 | * | 3/2000 | Lin et al. | 501/137 |
| 6,071,842 | * | 6/2000 | Takahashi et al. | 501/137 |

FOREIGN PATENT DOCUMENTS

| 60-257008 | 12/1985 | (JP) . |
|---|---|---|
| 61-21966 | 1/1986 | (JP) . |

OTHER PUBLICATIONS

"A new BaO–TiO2 compound with temperature–stable high permittivity and low microwave loss" by H.M. O'Bryan Jr. et al; Journal of the American Ceramic Society. vol 57, No. 10, p. 450–453, Oct. 1974.*

* cited by examiner

Primary Examiner—Cathy Lam
(74) Attorney, Agent, or Firm—Snider & Associates; Ronald R. Snider

(57) ABSTRACT

The dielectric ceramic composition is composed of a sintered body of ceramic particles containing $Ba_2Ti_5O_{11}$ as a major component. The ceramic particles may contain Ag in the form of solid solution at the rate of 0.2% to 3.0% by mole. the ceramic particles may further contain $Ba_2TiSi_2O_8$ so the $BaTi_5O_{11}/Ba_2TiSi_2O_8$ ratio is 1.5 to 9 $BaTi_5O_{11}$ to 1 $Ba_2TiSi_2O_8$. The dielectric ceramic composition can be sintered at a low enough temperature to enable a highly conductive metal such as Ag, Cu or the like to be burned and sintered integrally.

15 Claims, No Drawings

DIELECTRIC CERAMIC COMPOSITION AND CERAMIC ELECTRONIC PARTS

CROSS-REFERENCE

This application claims the priority of Japanese Patent Application No. H10-208286, filed on Jul. 23, 1998, which is incorporated herein by reference.

BACKGROUND OF THE INVENTION

1. Field of the Invention

The present invention relates to a dielectric ceramic composition and a ceramic electronic part using the same. More particularly, the present invention relates to a dielectric ceramic composition suitable as a raw material for a multilayer electronic device such as a laminated-type ceramic capacitor, resonator, filter, and so on, particularly electronic device for micro waves, and to a ceramic electronic part using the dielectric ceramic composition.

2. Description of the Related Art

Ceramic electronic parts such as a multilayer ceramic capacitor, resonator, filter, and the like are generally prepared in which an electrode material and a dielectric ceramic composition are multilayer in sequence in a given lamination structure and they are sintered by burning them integrally. The lamination structure can make ceramic electronic parts compact in size yet high in performance.

A representative example of ceramic electronic parts of a multilayer type may include a multilayer ceramic capacitor of a compact size and a high capacity, which can be prepared by forming a dielectric ceramic composition of a barium titanate system and an electrode material composed of Ni metal in a given lamination structure and sintering them by burning them integrally at high temperature.

Recent years, portable communications devices utilizing micro waves having more than a GHz band have been used widely so that great demands have been made to develop ceramic electronic parts for micro waves, which have higher performance.

Characteristics of ceramic electronic parts for micro waves, in a first respect, are likely to undergo influences to a great extent from dielectric characteristics of a dielectric ceramic composition which is used as a raw material for a dielectric layer of the ceramic electronic part. As a dielectric ceramic composition for use as a material for the dielectric layer of a ceramic electronic part for micro waves, there are known, for example, dielectric ceramic compositions of a BaO—TiO$_2$ series, BaO—Nd$_2$O$_3$—TiO$_2$ series, MgTiO$_2$—CaTiO$_2$ series, and so on.

The characteristics of the ceramic electronic parts for micro waves are also influenced by the electrical conductivity of a metal which is used as a raw material for an inner electrode. In this respect, it is preferred to use a metal having a high electrical conductivity as a raw material for the inner electrode of a ceramic electronic part. Such a metal may include, for example, Ag, Cu, and so on.

The melting point of Ag is 960° C. and the melting point of Cu is 1,083° C., while the temperature of sintering the dielectric ceramic composition for use as the raw material for the dielectric layer of the ceramic electronic part for micro waves is higher than 1,200° C., so that the sintering temperature is considerably higher than the melting point of the metal suitable for the raw material of the inner electrode for the ceramic electronic parts. It is therefore impossible to burn the dielectric layer integrally with the inner electrode for sintering so that the metal such as Ag, Cu and so on cannot be used as a raw material for the inner electrode, although it is suitable therefor.

In order to allow the such metal to be used as the raw material for the inner electrode of the ceramic electronic part for micro waves, it is required that the temperature for sintering the dielectric ceramic composition for use as the raw material for the dielectric layer of the ceramic electronic part be lowered below the melting point of the metal such as Ag, Cu or the like to be used as the raw material of the inner electrode, that is, as low as approximately 900° C. to 1,050° C.

Generally, it is known that the temperature for sintering a dielectric ceramic composition can be lowered by adding a glass component as a sintering aid in the dielectric ceramic composition. As described above, the sintering temperature of the dielectric ceramic composition is as considerably high as 1,200° C. or more, so that it is required to add a considerably large amount of a glass component to the dielectric ceramic composition in order to lower the sintering temperature to the range of approximately 900° C. to 1,050° C.

The addition of the glass component to the dielectric ceramic composition in such a large quantity, however, will cause a decrease in dielectric characteristics inherent in the dielectric ceramic composition which is used as the raw material for the dielectric layer of the ceramic electronic part for micro wave, thereby failing to achieve dielectric characteristics to the level as required.

With the foregoing drawbacks of the conventional sintering conditions taken into account, extensive review and studies have been made to provide a dielectric ceramic composition for use in sintering at temperature lower than the melting point of a metal suitable as a raw material of the inner electrode and capable of being burned integrally with the such metal for sintering, and to provide a ceramic electronic part having a high dielectric performance, which is prepared from the such dielectric ceramic composition. It has now been found that a dielectric ceramic composition having a particular composition can be sintered at a temperature low enough to be burned integrally with the metal such as, for example, Ag, Cu or the like, which is highly electrically conductive and useful as the raw material for the inner electrode of the ceramic electronic part, and that the dielectric ceramic composition can demonstrate sufficiently high dielectric characteristics that the major phase thereof should originally produce. It is also found that a ceramic electronic part having highly dielectric characteristics can be prepared by forming its dielectric layer from the such dielectric ceramic composition. The present invention has been completed on the basis of these findings.

SUMMARY OF THE INVENTION

Therefore, the present invention has the object to provide a dielectric ceramic composition which can be sintered at a temperature lower than the melting point of a metal such as Ag, Cu or the like to be used as a raw material for an inner electrode by burning the dielectric ceramic composition integrally with the metal and at the same time which can demonstrate sufficiently high dielectric characteristics to be achieved by the major phase thereof that should originally produce the dielectric characteristics.

The present invention has another object to provide a ceramic electronic part which uses the dielectric ceramic composition as a dielectric layer therefor, which achieves a high level of dielectric characteristics that is sought to be achieved by sintering the dielectric ceramic composition with the metal for use as a raw material for an inner electrode thereof by burning them integrally with one another.

In order to achieve the object, the present invention in an aspect provides a dielectric ceramic composition comprising a sintered member of ceramic particles containing $BaTi_5O_{11}$, as a major component.

The present invention in another aspect provides a ceramic electronic part comprising a dielectric layer and inner electrodes interposing the dielectric layer, wherein the dielectric layer comprises the dielectric ceramic composition which is composed of the sintered member of the ceramic particles containing $BaTiO_1O_{11}$ as the major component.

Other objects, features and advantages of the present invention may become apparent in the course of the description that follows.

DESCRIPTION OF THE PREFERRED EMBODIMENTS

The dielectric ceramic composition according to the present invention comprises a sintered member of ceramic particles containing $BaTi_5O_{11}$ as a major component. The ceramic particles may preferably contain Ag in the form of a solid solution. The amount of Ag in the form of solid solution may be in the range of 0.2% to 3.0% by mole. If the amount of Ag in the solid solution would become too low, on the one hand, it is not preferred that the sintering temperature may rise to as high as 950° C. and that the results of water-vaporproof load tests will be impaired. If the amount of Ag in the form of solid solution would become too large, on the other, the resulting dielectric ceramic composition may suffer from the disadvantage that both Q factor and dielectric constant-temperature characteristics are decreased.

The ceramic particles may preferably contain $Ba_2TiSi_2O_8$ in the range of 1.5–9 to 1 in the ratio of $BaTi_5O_{11}$ to $Ba_2TiSi_2O_8$, i.e., in the $BaTi_5O_{11}/Ba_2TiSi_2O_8$ ratio of 1.5–9 ($BaTi_5O_{11}$) to 1 ($Ba_2TiSi_2O_8$). If the $BaTi_5O_{11}/Ba_2TiSi_2O_8$ ratio would become too low, on the one hand, temperature characteristics (TCC) may become poor to outside ±100 ppm/° C. If the $BaTi_5O_{11}/Ba_2TiSi_2O_8$ ratio would become too high, on the other, the dielectric ceramic composition could not be sintered in a highly tight state if it is sintered at 1,050° C.

Further, the sintered member may contain a glass phase as a sintering aid. As the glass phase, there may be used one or more selected from $SiO_2$, $ZnO$, $Bi_2O_3$ and $B_2O_3$, but it is not limited to such a particular one and there may be used any other material that can form a glass phase and decrease the characteristics of $BaTi_5O_{11}$.

Moreover, as a raw material for an inner electrode, there may be used an electrically conductive paste containing Ag or Cu as a major component.

The present invention will be described in more detail by way of examples.

EXAMPLE 1

There were prepared $BaTi_5O_{11}$ powder synthesized in advance and $SiO_2$—$B_2O_3$—$MgO$ glass formed by melting and crushing. The $BaTi_5O_{11}$ powder and the $SiO_2$—$B_2O_3$—$MgO$ glass were weighed at rates as indicated in Table 1 below.

The weighed $BaTi_5O_{11}$ powder and $SiO_2$—$B_2O_3$—$MgO$ glass were placed in a polyethylene pot, together with water, and the resulting mixture was wet-mixed well and then dehydrated and dried. The dry material was burned in air at 800° C. for 2 hours, yielding a component material for a dielectric ceramic.

The component material for the dielectric ceramic was then placed in a polyethylene pot together with water and pulverized well in a wet state, yielding powder. The resulting powder was then dehydrated and dried, yielding a raw powder material for the dielectric ceramic.

To the resulting raw powder material for the dielectric ceramic was added an organic binder, and the mixture was granulated. The resulting granular material was formed into a disk-shaped body having a diameter of 9.8 mm and a thickness of 0.6 mm by applying pressure at 500 kgf/cm².

The disk-shaped body was then placed on a zirconia setter and burned at 900 ° C. to 950° C. for 2 hours to sinter the disk-shaped body, thereby yielding a disk-shaped dielectric ceramic member.

A portion of the disk-shaped dielectric ceramic member was subjected to XRD diffraction analysis, thereby determining a diffraction X-ray spectrum.

The deviation of angle of a peak (peak Δ2θ°) was found from the diffraction X-ray spectrum as indicated in Table 1 attached hereto. These results indicate that Ag is present in the form of solid solution in the $BaTi_5O_{11}$ phase.

The disk-shaped dielectric ceramic member obtained by burning was then coated with a silver paste on its both sides and baked to form a ceramic capacitor. The ceramic capacitor was measured for a dielectric constant, $\epsilon_r$, Q factor, and a temperature coefficient of the dielectric constant, $\tau\epsilon_r$ (ppm/° C.). The results are shown in Table 1.

The dielectric constant, Er, was measured with an LCZ meter at the frequency of 1 MHz, voltage of 1 V and ambient temperature of 20° C. The Q factor was also measured under conditions of 1 MHz, 1 V and 20° C. The temperature coefficient of capacitance, $\tau\epsilon_r$ (ppm/° C.), was measured by placing the ceramic capacitor in a thermostat and measuring the capacitance ($C_{20}$) at 20° C. and the capacitance ($C_{85}$) at 85° C. under conditions of 1 MHz and 1 V while varying the temperature from 20° C. to 85° C., and making calculation in accordance with the following equation:

$$\tau\epsilon_r=(C_{85}-C_{20})/C_{20}\times 1/(85-20)(ppm/° C.)$$

In order to determine the reliability of the resulting ceramic capacitor, it was subjected to water-vaporproof load tests for 24 hours at the temperature of 120° C., the moisture of 98%, and the voltage of 50 V. A rate of variations in insulation resistance before and after the test was then determined, and the test results were found as shown in Table 1.

From the results of Table 1, it can be found that the sintering temperature can be lowered to 900–920° C. while dielectric constant of the dielectric ceramic can be maintained at as high as 70 to 80, when Ag is contained in the form of solid solution in the rate of 0.2% to 3.0% by mole with respect to the ceramic particles containing the $BaTi_5O_{11}$ phase as the major component.

Further, it is found that the effects achieved by the present invention does not rely on the starting materials. Oxides of rare earth elements which are used as a raw material for $BaTi_5O_{11}$ ceramics may include, for example, $Y_2O_3$, $CeO_2$, $La_2O_3$, $Pr_6O_{11}$, $Sm_2O_3$, $Gd_2O_3$, and so on. As a starting material, it is also possible to use $BaCO_3$, in place of $BaO$, and to use hydroxides, oxalates, etc. of rare earth elements, in place of rare earth elements.

Moreover, it is found that the effects achieved by the present invention does not rely on a variation in the reaction phase during the reaction. As the effects are produced by a final crystal structure, the effects cannot be varied by changing reaction processes before crystallization.

Example 2

Powders of compounds, i.e., $BaCO_3$, ZnO, $TiO_2$, $SiO_2$, $Bi_2O_3$, $Mn_3O_4$, and $Ag_2O$, were weighed at rates as indicated on Sample No. 8 in Table 2 below. The compounds were used herein having the purity of 99.0% or higher.

The weighed powders were all placed in a ball mill, together with water, and ball-milled in a wet state for 15 hours. The resulting slurry was transferred to a vat and placed in a drier to dry at 150° C. for 24 hours with stirring. The dried material was then crushed with a crusher to yield 325-mesh powders which in turn were burned in air at 800° C. for 3 hours.

The resulting powders were again placed in a ball mill, together with an organic binder, and ball-milled to yield a slurry of a ceramic raw material. The slurry was then defoamed and formed by the doctor blade method into a ceramic green sheet having a given size.

On the other hand, an electrically conductive paste containing silver powder as a major component for use as an inner electrode was prepared and printed on the resulting ceramic green sheet to form 50 of conductive patterns which in turn were dried.

Several ceramic green sheets on each of which the conductive patterns were printed were multilayer on one another with the printed conductive patterns facing above. Upon laminating several ceramic green sheets, an upper ceramic green sheet was superimposed on a lower ceramic green sheet so as for the conductive patterns printed on the upper ceramic green sheet to diverge approximately by half in the lengthwise direction from the conductive patterns printed on the lower ceramic green sheet. Further, a ceramic green sheet on which no pattern was printed was multilayer on the top surface and the bottom surface of the multilayer sheet so prepared above.

The resulting multilayer sheet was then pressed and attached integrally together by applying pressure thereto in the thickness direction. The multilayer sheet so pressed was then cut in the lattice form into 50 chip-shaped multilayer members so as for each chip-shaped multilayer member to contain one conductive pattern.

The chip-shaped multilayer members were then placed in an electric furnace and burned in ambient atmosphere at 950° C. for 3 hours, thereby yielding chip-shaped element members. On the both end sides of each of the chip-shaped element members was coated an electrically conductive paste composed of Ag, and the chip-shaped element members were baked forming a pair of outer electrodes on each of the element members and producing multilayer ceramic capacitors.

The resulting multilayer ceramic capacitors were then subjected to the ink test in order to measure sintering performance of the dielectric layers thereof, and it was found that the dielectric layers of the multilayer ceramic capacitors were sintered tightly. The ink test was carried out by immersing samples of the multilayer ceramic capacitors in ink and determining as "OK" when the ink did not penetrate into the sample, while determining as "NG" when the ink penetrated into the sample.

The multilayer ceramic capacitors were further measured for temperature characteristics (TCC), and the temperature characteristics (TCC) were found that the samples of the multilayer ceramic capacitors were located within ±100 ppm/° C. The temperature characteristics (TCC) were determined as a rate of a variation in the capacitance at the temperature of 85° C. when the capacitance at the temperature of 20° C. was set as a standard.

Moreover, the multilayer ceramic capacitor was measured for an XDR profile of the dielectric ceramic composition constituting the dielectric layer thereof, and it was found that a $BaTi_5O_{11}/Ba_2TiSi_2O_8$ ratio was 2.7.

A multilayer ceramic capacitor (Sample No. 9) was formed in substantially the same manner as Sample No. 8 indicated in Table 2 below, except for changing the rates of the compounds to be used as raw materials for Sample No. 9 of Table 2 below.

The resulting multilayer ceramic capacitor (Sample No. 9) was tested for the dielectric layer thereof in the same manner as above and found that the dielectric layer of the multilayer ceramic capacitor was sintered tightly. The temperature characteristics (TCC) of Sample No. 9 was also found to be located within ±100 ppm/° C.

From the XRD profile of the dielectric ceramic composition constituting the dielectric layer of the multilayer ceramic capacitor (Sample No. 9), the $BaTi_5O_{11}/Ba_2TiSi_2O_8$ ratio was found to be 9.

A multilayer ceramic capacitor (Sample No. 10) was formed in substantially the same manner as Sample No. 8 indicated in Table 2 below, except for changing the rates of the compounds to be used as raw materials for Sample No. 10 of Table 2 below.

The resulting multilayer ceramic capacitor (Sample No. 10) was tested for the dielectric layer thereof in the same manner as above and found that the dielectric layer of the multilayer ceramic capacitor was sintered tightly. The temperature characteristics (TCC) of Sample No. 10 was also found to be located within +100 ppm/° C.

From the XRD profile of the dielectric ceramic composition constituting the dielectric layer of the multilayer ceramic capacitor (Sample No. 10), the $BaTi_5O_{11}/Ba_2TiSi_2O_8$ ratio was found to be 1.5.

Likewise, a multilayer ceramic capacitor (Sample No. 11) was formed in substantially the same manner as Sample No. 8 indicated in Table 2 below, except for changing the rates of the compounds to be used as raw materials for Sample No. 11 of Table 2 below.

The resulting multilayer ceramic capacitor (Sample No. 11) was tested for the dielectric layer thereof in the same manner as above and found that the dielectric layer of the multilayer ceramic capacitor was sintered tightly. The temperature characteristics (TCC) of Sample No. 11 was also found to be located within ±100 ppm/° C.

From the XRD profile of the dielectric ceramic composition constituting the dielectric layer of the multilayer ceramic capacitor (Sample No. 11), the $BaTi_5O_{11}/Ba_2TiSi_2O_8$ ratio was found to be 12.

A multilayer ceramic capacitor (Sample No. 12) was formed in substantially the same manner as Sample No. 8 indicated in Table 2 below, except for changing the rates of the compounds to be used as raw materials for Sample No. 12 of Table 2 below.

The resulting multilayer ceramic capacitor (Sample No. 12) was tested for the dielectric layer thereof in the same manner as above and found that the dielectric layer of the multilayer ceramic capacitor was sintered tightly. The temperature characteristics (TCC) of Sample No. 10 was also found to be located within +100 ppm/° C.

From the XRD profile of the dielectric ceramic composition constituting the dielectric layer of the multilayer ceramic capacitor (Sample No. 12), the $BaTi_5O_1$/$Ba_2TiSi_2O_8$ ratio was found to be 1.4.

EFFECTS OF THE INVENTION

In accordance with the present invention, the dielectric ceramic composition comprises a sintered member of ceramic particles containing $BaTi_5O_{11}$ as a major component, so that it can be sintered at a lower temperature without decreasing electrical characteristics, and a highly conductive metal such as Ag, Cu or the like can be used as a raw material for the inner electrode. Therefore, the present invention can provide the ceramic electronic part with good high-frequency characteristics.

Further, the present invention has the effect in that, when Ag is contained in the form of a solid solution in the ceramic particles containing $BaTi_5O_{11}$ as the major component, the crystal lattice of the resulting ceramics is so strained that the dielectric constant can be improved up to 90 to 95 and, even if a sintering aid would be added, the dielectric constant can be ensured to a level as sufficiently high as 70 to 80. Therefore, the dielectric ceramic composition according to the present invention can provide the ceramic electronic part compact in size yet sufficiently high in dielectric constant.

Moreover, the present invention can bring about the effects of decreasing the sintering temperature to approximately 900° C. to 920° C. and controlling the diffusion of Ag in the conductive member when Ag is contained in the form of solid solution in the ceramic particles containing $BaTi_2O_{11}$ as the major component, because the crystal lattice of the ceramic particles is caused to be strained by the solid solution of Ag and the substances are allowed to migrate rapidly therein during sintering.

In addition, the present invention has the effect of providing the ceramic electronic parts having good high-frequency characteristics, when the $BaTi_5O_{11}$/$Ba_2TiSi_2O_8$ ratio is set to approximately 1.5 to 9, because the dielectric ceramic composition according to the present invention can be sintered at a lower temperature without causing a decrease in the characteristics of the ceramic particles having $BaTi_5O_{11}$ as the major component and the highly conductive metal such as Ag, Cu, or the like can be used as a raw material for the inner electrode.

TABLE 1

| No | Ag (% by mol) | Sintering Aid (% by wt) | Peak Δ2θ° | Sintering temp (° C.) | Dielectric constant εr | Q factor | τε (ppm/° C.) | Results of Water-Vapor-proof Load Test |
|---|---|---|---|---|---|---|---|---|
| 1 | 0 | $SiO_2$—$B_2O_3$—MgO (4.5) | 0 | 950 | 66 | 1,000 | −80 | −18% |
| 2 | 0.2 | $SiO_2$—$B_2O_3$—MgO (4.5) | 0.01 | 940 | 71 | 950 | −72 | −1% |
| 3 | 1.5 | $SiO_2$—$B_2O_3$—MgO (4.5) | 0.08 | 920 | 75 | 950 | −73 | 1% |
| 4 | 3.0 | $SiO_2$—$B_2O_3$—MgO (4.5) | 0.15 | 910 | 79 | 910 | −78 | −1% |
| 5 | 3.5 | $SiO_2$—$B_2O_3$—MgO (4.5) | 0.17 | 900 | 79 | 790 | −102 | −2% |
| 6 | 1.5 | $SiO_2$—$B_2O_3$—CaO (4.0) | 0.15 | 910 | 73 | 960 | −70 | 1% |
| 7 | 1.5 | $SiO_2$—$B_2O_3$—$Al_2O_3$ (5.0) | 0.14 | 920 | 73 | 980 | −79 | ±0% |

TABLE 2

(unit: grams)

| Sample No. | $BaCO_3$ | ZnO | $TiO_2$ | $SiO_2$ | $Bi_2O_3$ | $Mn_3O_4$ | $Ag_2O$ | BT5/BTS | Remarks |
|---|---|---|---|---|---|---|---|---|---|
| 8 | 74.00 | 3.38 | 119.78 | 10.00 | 2.42 | 0.32 | 4.48 | 2.7 | |
| 9 | 70.26 | 5.10 | 127.30 | 5.00 | 2.40 | 0.32 | 4.50 | 9 | |
| 10 | 74.33 | 5.40 | 113.00 | 15.00 | 2.50 | 0.32 | 4.50 | 1.5 | |
| 11* | 76.79 | 1.67 | 124.53 | 4.92 | 2.39 | 0.31 | 4.39 | 12 | Not sintered tightly |
| 12* | 74.71 | 3.42 | 114.42 | 15.17 | 2.45 | 0.32 | 4.51 | 1.4 | TCC worsened |

BT5 = $BaTi_5O_{11}$
BTS = $Ba_2TiSi_2O_8$
*Samples for use as Comparative Examples

What is claimed is:

1. A dielectric ceramic composition comprising a sintered member of ceramic particles containing a compound chemically known as $BaTi_{5O11}$ as a major component by weight %, wherein the $BaTi_5O_{11}$ is at least 60% by weight % in the sintered member of ceramic particles.

2. The dielectric ceramic composition as claimed in claim 1, wherein Ag is contained in the form of solid solution in the ceramic particles.

3. The dielectric ceramic composition as claimed in claim 1, wherein said Ag is contained in the form of solid solution in said ceramic particles at the rate of 0.2% to 3.0% by mole.

4. The dielectric ceramic composition as claimed in claim 1, wherein said ceramic particles further contain a compound chemically known as $Ba_2TiSi_2O_8$ so that a $BaTi_5O_{11}$/$Ba_2TiSi_2O_8$ ratio is 1.5 to 9 $BaTi_5O_{11}$ to 1 $Ba_2TiSi_2O_8$.

5. The dielectric ceramic composition as claimed in claim 1, wherein said sintered member of said ceramic particles contains a sintering aid.

6. The dielectric ceramic composition as claimed in claim 2, wherein said Ag is contained in the form of solid solution in said ceramic particles at the rate of 0.2% to 3.0% by mole.

7. The dielectric ceramic composition as claimed in claim 2, wherein said ceramic particles further contain a compound chemically known as $Ba_2TiSi_2O_8$ so that a $BaTi_5O_{11}$/$Ba_2TiSi_2O_8$ ratio is 1.5 to 9 $BaTi_5O_{11}$ to 1 $Ba_2TiSi_2O_8$.

8. A ceramic electronic part comprising a dielectric layer and an inner electrode interposing said dielectric layer, wherein said dielectric layer is composed of a dielectric ceramic composition; and said dielectric ceramic composition comprises a sintered member of ceramic particles containing a compound chemically known as $BaTi_5O_{11}$ as a major component by weight %, wherein the $BaTi_5O_{11}$ is at least 60% by weight % in the sintered member of ceramic particles.

9. The ceramic electronic part as claimed in claim 8, wherein Ag is contained in the form of solid solution in the ceramic particles.

10. The ceramic electronic part as claimed in claim 8, wherein said Ag is contained in the form of solid solution in said ceramic particles at the rate of 0.2% to 3.0% by mole.

11. The ceramic electronic part as claimed in claim 8, wherein said ceramic particles further contain a compound chemically known as $Ba_2TiSi_2O_8$ so that a $BaTi_5O_{11}/Ba_2TiSi_2O_8$ ratio is 1.5 to 9 $BaTi_5O_{11}$ to 1 $Ba_2TiSi_2O_8$.

12. The ceramic electronic part as claimed in claim 8, wherein said sintered member of said ceramic particles contains a sintering aid.

13. The ceramic electronic part as claimed in claim 8, wherein said inner electrode comprises an electrically conductive material containing Ag or Cu as a major component.

14. The ceramic electronic part as claimed in claim 9, wherein said Ag is contained in the form of solid solution in said ceramic particles at the rate of 0.2% to 3.0% by mole.

15. The ceramic electronic part as claimed in claim 9, wherein said ceramic particles further contain a compound chemically known as $Ba_2TiSi_2O_8$ so that a $BaTi_5O_{11}/Ba_2TiSi_2O_8$ ratio is 1.5 to 9 $BaTi_5O_{11}$ to 1 $Ba_2TiSi_2O_8$.

* * * * *